(12) United States Patent
Barrenscheen et al.

(10) Patent No.: US 8,219,730 B2
(45) Date of Patent: Jul. 10, 2012

(54) METHOD OF TRANSMITTING DATA BETWEEN DEVICES CONNECTED VIA A MULTI-MASTER BUS DEFINING A TIME SLOT DURING TRANSMISSION FOR RESPONSIVE OUTPUT INFORMATION FROM NON-BUS MASTER DEVICES

(75) Inventors: Jens Barrenscheen, München (DE); Wilhard Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 613 days.

(21) Appl. No.: 09/883,817

(22) Filed: Jun. 18, 2001

(65) Prior Publication Data

US 2002/0002647 A1    Jan. 3, 2002

(30) Foreign Application Priority Data

Jun. 16, 2000   (DE) .................................. 100 29 834

(51) Int. Cl.
*G06F 13/36*   (2006.01)
(52) U.S. Cl. ........................................ 710/117; 370/498
(58) Field of Classification Search .................. 370/498; 710/100, 117–118
See application file for complete search history.

(56) References Cited

U.S. PATENT DOCUMENTS

| | | | |
|---|---|---|---|
| 4,896,151 A | 1/1990 | Kuranami et al. | |
| 5,293,571 A | 3/1994 | Matsuda et al. | |
| 6,212,633 B1* | 4/2001 | Levy et al. | 713/153 |
| 6,347,097 B1* | 2/2002 | Deng | 370/498 |
| 6,353,615 B1 | 3/2002 | Bohne | |
| 2002/0141418 A1* | 10/2002 | Ben-Dor et al. | 370/398 |
| 2002/0196806 A1* | 12/2002 | Ghodrat et al. | 370/465 |

FOREIGN PATENT DOCUMENTS

| | | |
|---|---|---|
| DE | 195 10 280 A1 | 9/1995 |
| DE | 196 20 137 A1 | 11/1997 |
| DE | 197 21 740 A1 | 11/1998 |
| EP | 0 395 495 A1 | 10/1990 |
| GB | 2 288 518 A | 10/1995 |

OTHER PUBLICATIONS

IEEE 1394 Serial Bus Controller (http://www.fma.fujitsu.com/pdf/1394fact.pdf), Fujitsu, Nov. 1996.*

* cited by examiner

*Primary Examiner* — Clifford Knoll
(74) *Attorney, Agent, or Firm* — Laurence A. Greenberg; Werner H. Stemer; Ralph E. Locher

(57) ABSTRACT

In the novel device and the novel method the data to be transmitted is transmitted in units together with information that is required or useful for the transmission and/or the use of the data. At least some of the units comprise at least one region which defines a time slot within which freely selectable devices can output onto the bus data representing freely selectable information at freely selectable points in time.

46 Claims, 1 Drawing Sheet

METHOD OF TRANSMITTING DATA BETWEEN DEVICES CONNECTED VIA A MULTI-MASTER BUS DEFINING A TIME SLOT DURING TRANSMISSION FOR RESPONSIVE OUTPUT INFORMATION FROM NON-BUS MASTER DEVICES

BACKGROUND OF THE INVENTION

Field of the Invention

The present invention relates to a method of transmitting data between devices that are connected via a bus, and to a device that can be connected to other devices via a bus.

Such methods and devices have been known for many years in numerous embodiments, and therefore do not require any more detailed explanation.

A possible design of a system in which a plurality of devices are connected via a bus is illustrated schematically in FIG. 1. Here, the devices which are to be connected are designated by the reference symbols N1, N2, . . . Nn, and the bus interconnecting these devices is designated by the reference symbol BUS.

In the system shown in FIG. 1, in principle any of the devices N1, N2, . . . Nn can transmit data to any other device via the bus BUS.

A known problem with data transmissions between devices which are connected to one another via a bus is that the intention is that the transmission of data should take place very quickly and efficiently, but that, on the other hand, it must also be ensured that the data to be transmitted arrives in a fault-free condition.

In the prior art it has not been possible to solve this problem in a completely satisfactory way: either the transmission of data is very fast, but the price to be paid is that it is not reliable under all circumstances; or else, the transmission of data is very reliable, but the price to be paid is that it is not so fast.

SUMMARY OF THE INVENTION

The object of the present invention is to provide a method for transmitting data between bus-connected devices and a device that is connectible to other devices via a bus, which overcomes the above-noted deficiencies and disadvantages of the prior art devices and methods of this general kind, and which enables data transmission that is, on the one hand, very fast and efficient and in which, on other hand, it is possible to ensure that the data to be transmitted arrive at the target in a fault-free condition.

With the above and other objects in view there is provided, in accordance with the invention, a method of transmitting data between devices interconnected via a bus, which comprises:
transmitting, in units, data and information, concerning at least one of a transmission and a use of the data, from a first device to one or more second devices to which the data does not concern, and/or one or more third devices, to which the data does concern;
forming the units at least partly with at least one region defining a given time slot within which the second and/or third devices can output onto the bus specific information; and
defining, in the second and third devices, enabled for outputting data within the given time slot, settings selected from the group consisting of a setting to determine under which conditions information and/or data are to be output within the given time slot, a setting to determine which information and/or data are to be output within the given time slot, and a setting to determine at which points in time within the time slot the information and/or data are to be output.

With the above and other objects in view there is also provided a method of transmitting data between devices interconnected via a bus, which comprises:
transmitting, in units, data and information concerning at least one of a transmission and a use of the data, from a first device to one or more second devices, to which the data does not concern, and/or one or more third devices, to which the data does concern;
forming the units at least partly with at least one region defining a given time slot within which the second and third devices can output onto the bus specific information; and
defining, at least in specific devices, settings selected from the group consisting of a setting to determine which other devices have to output information and/or data within the given time slot, a setting to determine which information and/or data are to be output within the given time slot by the other devices, and a setting to determine at which points in time within the given time slot the other devices have to output the respective information and/or data.

With the above and other objects in view there is also provided, in accordance with the invention, a device for connection to other devices via a bus, comprising means for transmitting data together with information concerning one of a transmission and a use of the data in units, wherein at least some of the units are formed with at least one region defining a time slot within which the device can output onto the bus information and/or data, and wherein the device contains settings selected from the group consisting of a setting determining under which conditions the device has to output information and/or data within the time slot, a setting determining which information and/or data the device has to output within the time slot, and a setting determining at which points in time within the time slot the information and/or data is to be output.

There is also provided, in accordance with the invention, a device for connection to other devices via a bus, comprising means for transmitting data together with information concerning one of a transmission and a use of the data in units, wherein at least some of the units are formed with at least one region defining a time slot within which one or a plurality of other devices can output onto the bus information and/or data, and wherein the device contains settings selected from the group consisting of a setting determining which other devices output information and/or data within the time slot, a setting determining which information and/or data representing information has to be output within the time slot by the other devices, and a setting determining at which points in time within the time slot the other devices have to output the respective information and/or data.

In other words, the methods and devices disclosed and claimed herein are defined in that
the data to be transmitted from a first device to one or more second devices to which the data does not concern, and/or one or more third devices, to which the data does concern is transmitted, together with information which is required or useful for the transmission and/or the use of the data, into units, at least some of which comprise at least one region which defines a time slot within which the second and/or third devices can output onto the bus information and/or data, and that, in the devices which must be able to output data within said time slot, settings are made to determine under which conditions information and/or data is to be output within the time slot, and/or which information and/or data is to be output within the time slot, and/or at which points in time within the time slot the information and/or data is to be output; and/or the data to be transmitted from a first device to one or more second devices to which the data does not concern, and/or one or more third devices, to which the data does concern is transmitted, together with information which is required or useful for the transmission and/or the use of the data, into units, at least some of which comprise at least one region which defines a time slot within which the second devices can output onto the bus information and/or data, and that settings are made, at least in specific devices, to determine which other devices have to output information and/or data within the time slot, and/or which information and/or data is to be output within the time slot by the other devices, and/or at which points in time within the time slot the other devices have to output the respective information and/or data; and/or the device is designed in such a way that the data to be transmitted can be transmitted, together with information which is required or useful for the transmission and/or the use of the data, into units, at least some of which comprise at least one region which defines a time slot within which the device can output onto the bus information and/or data, and that settings are made in the device to determine under which conditions it has to output information and/or data within the time slot and/or which information and/or data it has to output within the time slot and/or at which points in time within the time slot the information and/or data is to be output; and/or the device is designed in such a way that the data to be transmitted can be transmitted, together with information which is required or useful for the transmission and/or the use of the data, into units, at least some of which comprise at least one region which defines a time slot within which one or a plurality of other devices can output onto the bus information and/or data, and that settings are made in the device to determine which other devices have to output information and/or data within the time slot, and/or which information and/or data has to be output within the time slot by the other devices and/or at which points in time within the time slot the other devices have to output the respective information and/or data.

Such methods and devices prove advantageous in many ways:

on the one hand because, owing to the individual adjustability of the devices connected to the bus, it is possible, under all circumstances, to obtain reliable information indicating whether or not the devices for which the data to be transmitted is intended have received the data in a fault-free condition, on the other hand, because this information can be obtained directly after the transmission of the data, that is to say for example still in the frame or in the message in which the data to be transmitted is transmitted, on the other hand, if necessary, this information can also be received later, that is to say for example in a frame or in a message in which other data is transmitted, in addition, because there is no necessity to request and/or to transmit the information in one or more separate frames or messages, or—as is the case for example when transmission errors on the CAN bus are displayed—to bring about exceptional circumstances which indicate specific states or events, in addition, because the data can be sent without supplementary information, such as indication of the receiver, of the sender and/or of the significance of the data, owing to the individual adjustability of the devices connected to the bus, and finally, because the information and/or data can be output completely independently of the devices connected to the bus, i.e. without triggering or authorization by a device controlling the bus allocation (without arbitration) owing to the individual adjustability of the devices connected to the bus.

The transmission of data can thus be brought about surprisingly easily and at the same time extremely quickly, efficiently and reliably by means of the claimed methods and the claimed devices.

Any other information can also be received from the devices connected to the bus in an equally simple, fast, efficient and reliable fashion.

Other features which are considered as characteristic for the invention are set forth in the appended claims.

Although the invention is illustrated and described herein as embodied in a method for transmitting data between devices which are connected via a bus, and a device which can be connected to other devices via a bus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
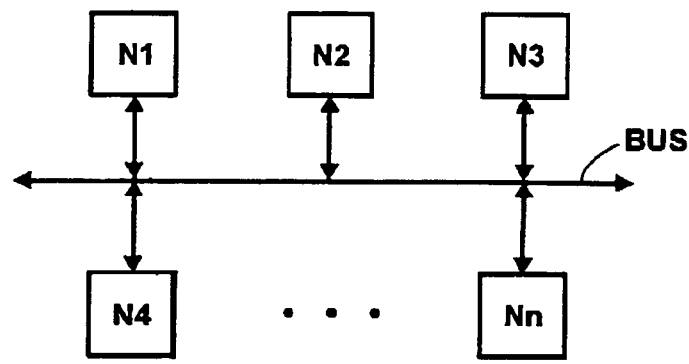
FIG. 1 is structural diagram showing the basic design of a system with devices connected via a bus.

The method described below is used to transmit data between devices which are connected via a bus; the device described below is a device which is suitable for carrying out the method. A possible design of the system in which the method and the device can be used is illustrated in FIG. 1. Reference is had to the introductory text above. It should be understood, however, that that the invention is not limited to the configuration of FIG. 1. The system can also be of any other desired configuration design.

The term "bus" can be understood to be a communications device which is not connection-orientated and via which data can be exchanged optically, electrically or in some other way between devices which are connected to the bus.

In the example in question, each of the devices N1, N2, . . . Nn which are connected to the bus BUS can become bus master; the system is therefore what is referred to as a multi-master bus system. However, there is no restriction to this. The use of the method described above also proves advantageous if just a single device or only a small number of the existing devices can become bus master.

In the present case, the devices N1, N2, ... Nn which are connected to the bus themselves determine who is bus master. This is carried out, as in the case of the CAN bus, taking into account the data transmitted via the bus; as long as a respective device finds again the data output by it on the bus, it can feel it is the bus master. However, the use of the method described below has also proven advantageous in systems in which the bus master is defined differently, for example by means of a bus controller.

The bus BUS of the system in question is supplied on a standard basis with a potential which represents the level 0 and is changed to a different potential "only" if a bit having the level 1 is to be transmitted via the bus. Because the potential representing the level 0 can be drawn, if necessary, to the potential representing the level 1, bits having the level 1 are designated as dominant bits and bits having the level 0 are designated as recessive bits. It should be apparent that there is no restriction to this. It is, of course, also possible to provide for the bits having level 1 to be the recessive bits and bits having the level 0 to be the dominant bits. The preassignment of a potential representing a specific level to the bus is carried out in the example in question using what is referred to as pull-down resistors or pull-up resistors which can be provided on devices connected to the bus, or elsewhere. The preassignment of a potential representing a specific level to the bus proves advantageous but is not a precondition for the method in question here to be applied.

In the example in question, the bus BUS is configured for a transmission of data which takes place sequentially on a bit-by-bit basis. However, there is not any restriction to this either. The use of the method described below can also prove advantageous if the transmission takes place in parallel or partially in parallel (for example sequentially on a byte-by-byte basis).

The method in question here is distinguished by the fact that the data to be transmitted from a first device to one or more second devices to which the data does not concern, and/or one or more third devices, to which the data does concern is transmitted, together with information which is required or useful for the transmission and/or the use of the data, into units, at least some of which comprise at least one region which defines a time slot within which the second and/or third devices can output onto the bus information and/or data, and that, in the devices which must be able to output information and/or data within said time slot, settings are made to determine under which conditions information and/or data is to be output within the time slot, and/or which information and/or data is to be output within the time slot, and/or at which points in time within the time slot the information and/or data is to be output, and/or the data to be transmitted from a first device to one or more second devices, to which the data does not concern, and/or one or more third devices, to which the data does concern is transmitted, together with information which is required or useful for the transmission and/or the use of the data, into units, at least some of which comprise at least one region which defines a time slot within which the second and/or third devices can output onto the bus information and/or data, and that settings are made, at least in specific devices, to determine which other devices have to output information and/or data within the time slot, and/or which information and/or data representing information is to be output within the time slot by the other devices, and/or at which points in time within the time slot the other devices have to output the respective information and/or data.

The device in question here is distinguished by the fact that the device is designed in such a way that the data to be transmitted can be transmitted, together with information which is required or useful for the transmission and/or the use of the data, into units, at least some of which comprise at least one region which defines a time slot within which the device can output onto the bus information and/or data, and that settings are made in the device to determine under which conditions it has to output information and/or data within the time slot and/or which information and/or data it has to output within the time slot and/or at which points in time within the time slot the information and/or data is to be output, and/or the device is designed in such a way that the data to be transmitted can be transmitted, together with information which is required or useful for the transmission and/or the use of the data, into units, at least some of which comprise at least one region which defines a time slot within which one or a plurality of other devices can output onto the bus information and/or data, and that settings are made in the device to determine which other devices have to output information and/or data within the time slot, and/or which information and/or data representing information has to be output within the time slot and/or at which points in time within the time slot the other devices have to output the respective information and/or data.

The aforesaid units in which the data to be transmitted is transmitted together with information that is required or useful for the transmission and/or the use of the data and/or further information, are, for example, the frames or messages which are known from already existing bus systems. However, the frames or messages which are used in the method in question here have a structure different from conventional frames or messages.

Figure 2:
FIG. 2 is a schematic showing an exemplary embodiment of the format of a message or of a frame, which is used to transmit data in the method described below and in the device described below.

An example of the structure of a frame or a message which is used in the method in question here is illustrated in FIG. 2.

In an exemplary embodiment, a first device may be represented by device N1, a second device by N2 to which the data transmitted by N1 does not concern, and a third device by N3 to which the data transmitted by N1 does concern. Devices N4-Nn may be of either the second device type or the third device type depending on whether or not the data transmitted by device N1 is intended for that particular device's use. In one embodiment, the bus is a multi-master bus such that the devices N1-Nn may alternate device types between a first device that transmits data and the second or third devices which may provide output during the given time slot.

This frame or this message comprises a synchronization field SYN, an identifier field ID, a control field CTRL, a data field DATA, an error detection field CRC, and a reply field REPLY.

The synchronization field SYN, the identifier field ID, the control field CTRL, the data field DATA and the error detection field CRC are filled with data comprising one or more bits in each case, by the device sending the frame or message, and are subsequently—as soon as the respective device can become bus master—output onto the bus sequentially on a bit-by-bit basis. Of these fields, the synchronization field SYN receives a specific bit or a specific bit sequence by means of which the start of a frame or of a message is indicated to the other devices;

the identifier field ID contains one or more bits which specify the type, the contents and/or the receiver of the respective frame or of the respective message;

the control field CTRL contains one or more bits which specify the length of the data field;

the data field DATA contains the data or the message which is actually to be transmitted; and the error detection field CRC contains one or more bits which can be used to detect and/or correct transmission errors.

The reply field REPLY is not filled with data, or at any rate only filled partially with data, by the device sending the frame or the message. This field thus defines a time slot in which the devices which are not bus master can, or must, output data onto the bus. Depending on the length of the time slot defined by the reply field, one or more bits can be transmitted via the bus in that time slot.

The information which is transmitted via the bus in the time slot defined by the reply field can be a very wide range of information, for example the signaling from one or more devices connected to the bus that said device or devices has/have received in a fault-free condition the frame or the message of which the reply field is a component (or possibly also a previously transmitted frame or a previously transmitted message or data contained in it), and/or the signaling from one or more devices connected to the bus that said device or devices has/had not received in a fault-free condition the frame or the message of which the reply field is a component (or possibly also a previously transmitted frame or a previously transmitted message or date contained in it), and/or information from one or more of the devices connected to the bus relating to their states (for example relating to the operating mode in which they are in, the utility factor, the temperature etc).

Settings which determine which device has to output which information onto the bus at which point in time are preferably made in the respective devices themselves. As a result, the respective devices can output onto the bus independently, i.e. without triggering or authorization by the device controlling the bus allocation or by some other device, the data to be output by them onto the bus, and can do this at the correct time.

The corresponding settings in the devices connected to the bus are expediently made before the start of the transmission of the frame or message which contains the reply field, preferably at the time of initialization of the system which takes place for example after said system is switched on. It proves advantageous if the settings can be varied during operation. This could be brought about, for example, by means of control instructions sent in appropriate frames or messages. The execution of the setting by means of frames or messages sent via the bus can be used not only when changing the settings but also when making new settings of the devices.

The corresponding settings are preferably stored in non-volatile memories provided in the respective devices. It is then, under specific circumstances, sufficient if the settings are made only when the system is first put into operation. Furthermore, it would then also be possible without difficulty (at any rate without repeated settings of the respective devices) for the devices to go in the meantime into an energy-saving operating mode (for example what is referred to as a sleep operating mode or what is referred to as a power down operating mode) during operation.

Which device has to output which information onto the bus at which point in time can also be set permanently in the devices (for example by means of an appropriate hardware implementation of the respective devices or using jumpers).

The settings can be made uniformly (identical for all devices) or individually (differently).

The settings are made in the example in question in such a way that the content of the current frame or of a specific preceding frame or the content of the current message or of a specific preceding message, in particular the receivers of the frame or message which is specified in it is made to determine which device has to output which information onto the bus at which point in time. There is thus a frame-specific or message-specific use of the reply field.

The length of the reply field (the length of the time slot defined thereby) is not subject to any restrictions and is preferably variable; it is expediently in each case precisely as long as is necessary to be able to transmit via the bus the information which is required or desired at this point in time.

The information and/or data which the individual devices feed onto the bus within the time slot defined by the reply field can be required and evaluated by any other devices, that is to say not only by the device which sends the respective frame or the respective message. In a system which is the same as or similar to that in FIG. 1, it is, of course, possible for all devices constantly to keep track of whether information and/or data is transmitted via the bus, and if appropriate of which information and/or data this is.

By means of the reply field and the possibility of defining when which device or devices is/are to output which information onto the bus, the devices connected to the bus can obtain, with minimum effort and at maximum speed, the information which is required for satisfactory operation of the system. This minimum effort and maximum speed is due to the fact that, it is not necessary for the information fed onto the bus in the reply field to be requested in a separate frame or in a separate message and/or to be sent to the devices requiring this information;

as a result of the selectability of the devices which are intended to reply, in each case only those devices from which information is required will output information;

as a result of the selectability of the information which the selected devices are intended to feed onto the bus in the time slot defined by the reply field, only the information which is actually required is transferred; and as a result of the selectability of the points in time at which the selected devices feed onto the bus the selected information within the time slot defined by the reply field, it is possible to determine unequivocally which information it is in each case and which information originates from which device or from which group of devices.

Some of the advantages which can be obtained by means of such a data transmission method and by means of such devices are explained below with reference to a number of selected examples.

It will firstly be assumed that the device sending the frame or the message requires information indicating whether the respective frame or the respective message has been received by the receiver in a fault-free condition. This can be brought about by virtue of the fact that the device for which the respective frame or the respective message is intended is set in such a way that it outputs, within the time slot defined by the reply field or at a specific point in time within the time slot defined by the reply field, a positive acknowledge bit formed by a dominant bit in the example in question onto the bus if up to then it has received the frame or the message in a fault-free condition, and it does not output a positive acknowledge bit (no dominant bit) if the opposite is the case, and the devices for which the respective frame or the respective message is not intended are set in such a way that, at least at the point in time at which the device for which the respective frame or the respective message is intended, they have to acknowledge the fault-free reception of the frame or of the message by outputting a positive acknowledge bit, do not output any data onto the bus or any information indicating whether or not they have received the frame or the message in a fault-free condition up to then.

As a result, the device sending the respective frame or the respective message receives an unambiguous acknowledgement indicating whether the frame or the message has arrived in a fault-free condition at the device for which it is intended. In this way, in contrast with a CAN bus, it is not possible for the frame or the message to be sent again even though the receiver for which the respective frame or the respective message is intended has received it in a fault-free condition.

If the respective frame or the respective message is intended for a plurality of receivers it is possible to provide:

that the devices for which the respective frame or the respective message is intended are set in such a way that, at different points in time within the time slot defined by the reply field, they output a positive acknowledge bit onto the bus if they have received the frame or the message in a fault-free condition until then, and they do not output a positive acknowledge bit if the opposite is the case, and that the devices for which the respective frame or the respective message is not intended are set in such a way that, at least at the points in time at which the devices for which the respective frame or the respective message is intended must be able to acknowledge the fault-free reception of the frame or of the message by outputting a positive acknowledge bit, said devices do not output any data onto the bus, nor any information indicating whether or not they have received the frame or the message in a fault-free condition until then.

As a result, the device sending the respective frame or the respective message receives an unambiguous acknowledgement indicating whether the frame or the message has arrived in a fault-free condition at each individual device for which it is intended. The same result can be obtained, if the devices for which the respective frame or the respective message is intended are set in such a way that, within the time slot defined by the reply field or at a specific point in time within the time slot defined by the reply field, they output a negative acknowledge bit formed by a dominant bit in the example in question onto the bus if they have not received the frame or the message in a fault-free condition until then, and they do not output a negative acknowledge bit (no dominant bit) if the opposite is the case, and that the devices for which the respective frame or the respective message is not intended are set in such a way that, at least at the point in time at which the devices for which the respective frame or the respective message is intended must be able to signal the non-fault-free reception of the frame or of the message by outputting a negative acknowledge bit, they do not output any data onto the bus, nor any information indicating whether or not they have received the frame or the message in a fault-free condition until then.

As a result, the device sending the respective frame or the respective message also receives an unambiguous acknowledgement indicating whether the frame or the message has arrived in a fault-free condition at all the devices for which the respective frame or the respective message is intended. Although, if a transmission error has occurred, it is not possible to determine here which of the devices has not received the frame or the message in a fault-free condition, this is not generally significant because, of course, the frame or the message has to be transmitted again in any case.

In cases in which it is necessary for specific devices, or for all the devices for which the respective frame or the respective message is intended start the further processing of the data contained in them synchronously (at the same time or at specific time intervals), it is possible to provide that not only the device sending the frame or the message but also the devices for which the respective frame or the respective message is intended monitor the data transmitted in the reply field via the bus, and that the further processing of the data contained in the respective frame or in the respective message is not started until it is apparent from the data transmitted in the reply field via the bus that the devices which are to be operated synchronously have received the frame or the message in a fault-free condition.

It may also prove advantageous, in addition, if at least specific devices for which the respective frame or the respective message is not intended acknowledge, within the reply field, the fault-free reception of the frame or of the message or acknowledge fault-free reception. However, these acknowledgements preferably take place at a different point in time within the time slot defined by the reply field from the corresponding acknowledgement by the devices for which the respective frame or the respective message is intended. If one or more of the devices for which the respective frame or the respective message is not intended signal a faulty reception, this does not have any influence on the transmission of the current frame or of the respective message, but, in particular if it occurs frequently, it permits conclusions to be drawn as to the transmission reliability in the system, and can be interpreted as an inducement to perform maintenance or repair work or to carry out changes in the system structure or in the system components.

It may also prove advantageous if individual devices, a plurality of devices or all the devices connected to the bus are set in such a way that they output a dominant bit onto the bus at different points in time within the time slot defined by the reply field if they have received the frame or the message in a fault-free condition until then and output a dominant bit—in each case at other different points in time within the time slot defined by the reply field—if the opposite is the case. This provides the possibility of monitoring whether the respective devices are still operating satisfactorily or for example—for whatever reason—have failed. It is possible to assume that the individual devices are still operating satisfactorily if they either signal a fault-free reception or a faulty reception; if one of the devices signals neither a fault-free reception nor a reception fault, or both a fault-free reception and a reception fault, this is a sign that the respective device is no longer operating satisfactorily.

It should be apparent that individual devices, a plurality of devices or all the devices connected to the bus, including the device sending a frame or a message, can also feed onto the bus any other information during the time slot defined by the reply field (at specific points in time within that time slot). Such information is, for example, information relating to the operating mode (normal operating mode, energy-saving operating mode etc.) which the device is currently in, or some other information which could be of interest for one or a plurality of other devices.

In particular if the data to be transferred via the bus is transmitted with a very high clock frequency, it is possible to provide that the devices are provided with a relatively long time period within which they can feed onto the bus information which is to be fed onto the bus, that is to say the devices can be provided, for example, with a time period in which two or more bits can be transmitted via the bus, in order to output the bit onto the bus. As a result, it is possible to avoid faults which result from the fact that a device is no longer able to feed onto the bus, within a clock period reserved for that purpose, the information which is to be output onto the bus owing to problems with the synchronization with the common transmission clock.

The abovementioned explanations make it clear that the method described for transmitting data between devices connected via a bus makes it possible for data to be transmitted quickly, with a high level of efficiency and nevertheless with absolute reliability.

It should be apparent that the frames or messages here can also have a structure other than that illustrated in FIG. 2. They may have, in particular, more fields, fewer fields and/or fields representing different contents.

The invention claimed is:

1. A method of transmitting data between devices interconnected via a bus, which comprises:
   transmitting, in units, data and information, concerning at least one of a transmission of the data and a use of the data, from a first device to one or more second devices to which the data does not concern, and one or more third devices to which the data does concern;
   forming the units at least partly with at least one region defining a given time slot within which the second and third devices output onto the bus specific information and/or data; and
   defining, in the second and third devices configured to output data acknowledging whether or not the data and information have been received by the second and third devices in a fault-free condition within the given time slot, settings selected from the group consisting of a setting to determine under which conditions information and/or data are to be output within the given time slot, a setting to determine which information and/or data are to be output within the given time slot, and a setting to determine at which points in time within the given time slot the information and/or data are to be output.

2. The method according to claim 1, which comprises determining the settings relating to the given time slot before a start of the transmission of the unit containing the given time slot.

3. The method according to claim 1, which comprises determining the settings relating to the given time slot with one or more of the devices connected to the bus.

4. The method according to claim 1, which comprises determining the settings relating to the given time slot based on one of data and instructions transmitted to the respective devices via the bus.

5. The method according to claim 1, which comprises determining the settings relating to the given time slot upon initializing the devices.

6. The method according to claim 1, which comprises storing the settings relating to the given time slot in nonvolatile memory devices.

7. The method according to claim 1, wherein the units for transmitting the data and the information concerning the transmission or the use of the data are frames.

8. The method according to claim 1, wherein the units for transmitting the data and the information concerning the transmission or the use of the data are messages.

9. The method according to claim 1, wherein the units in which the data to be transmitted are transmitted together with the information which is required or useful for the transmission and/or the use of the data is transmitted in each case serially via the bus at a specific transmission clock rate.

10. The method according to claim 1, which comprises determining with the data and information contained in the units containing the data and information required or useful for the transmission or the use of the data, whether certain devices output information onto the bus and at which points in time.

11. The method according to claim 10, which comprises determining with the data and information contained in the units which devices output information onto the bus.

12. The method according to claim 1, which comprises defining the given time slot for transmission of one or more bits via the bus.

13. The method according to claim 1, wherein the data to be output onto the bus during the given time slot comprise a positive acknowledge bit indicating that the device outputting the acknowledge bit onto the bus has previously received in a fault-free condition data transmitted via the bus.

14. The method according to claim 13, wherein the one or more second and/or third devices which are connected to the bus are set in such a way that exclusively, the one or more third devices, for which the data transmitted via the bus are intended, acknowledge the fault-free reception of the data by outputting a positive acknowledge bit onto the bus.

15. The method according to claim 13, wherein, if a plurality of the devices connected to the bus are set in such a way that they have to acknowledge the fault-free reception of the data by outputting a positive acknowledge bit, the plurality of devices are set such that the positive acknowledge bits are output by the plurality of devices at different points in time.

16. The method according to claim 14, wherein the devices connected to the bus are set such that the one or more second devices, for which the data transmitted via the bus is not intended, do not output any data onto the bus at least at the points in time at which the one or more third devices, for which the data transmitted via the bus is intended, must be able to acknowledge the fault-free reception of the data.

17. The method according to claim 1, wherein the data to be output onto the bus during the given time slot comprise a negative acknowledge bit indicating that the device outputting the negative acknowledge bit onto the bus has previously not received in a fault-free condition data transmitted via the bus.

18. The method according to claim 17, wherein the devices connected to the bus are set such that exclusively, the one or more third devices, for which the data transmitted via the bus is intended, signal a non-fault-free reception of the data by outputting a negative acknowledge bit onto the bus.

19. The method according to claim 17, wherein if a plurality of the devices connected to the bus are set such that they have to signal the non-fault-free reception of the data by outputting a negative acknowledge bit, at least some of the plurality of the devices are set such that they output at the same time the negative acknowledge bits that are to be output if at least some of the plurality of devices receive non-fault-free data.

20. The method according to claim 17, wherein the devices connected to the bus are set such that the at least one second device, for which the data transmitted via the bus is not intended, does not output any data onto the bus at least at the points in time at which the at least one third device, for which the data transmitted via the bus is intended, must be able to signal the non-fault-free reception of the data.

21. The method according to claim 1, wherein the devices connected to the bus are set such that individual devices, a plurality of devices, or all the devices connected to the bus output a positive acknowledge bit onto the bus at different points in time within the given time slot if the devices have received in a fault-free condition data previously transmitted via the bus, or they output a negative acknowledge bit if the opposite is the case, in each case at other, different points in time within the given time slot.

22. The method according to claim 1, wherein the devices connected to the bus are set such that a content of the current frame or of a specific preceding frame or the content of the current message or of a specific preceding message determines which of the devices has to output which information onto the bus at which point in time.

23. A method of transmitting data between devices interconnected via a bus, which comprises:
transmitting, in units, data and information, concerning at least one of a transmission and a use of the data, from a first device to one or more second devices, to which the data is not intended, and one or more third devices, to which the data is intended;
forming the units at least partly with at least one region defining a given time slot within which the one or more second and third devices output onto the bus information and/or data, the one or more second devices and one or more third devices configured to output data acknowledging whether or not the data and information have been received by the second and third devices in a fault-free condition within the given time slot; and
defining, in the first device, settings selected from the group consisting of a setting to determine which other devices have to output information and/or data within the given time slot, a setting to determine which information and/or data are to be output within the given time slot by the other devices, and a setting to determine at which points in time within the given time slot the other devices have to output the respective information and/or data.

24. The method according to claim 23, which comprises determining the settings relating to the given time slot before a start of the transmission of the unit containing the given time slot.

25. The method according to claim 23, which comprises determining the settings relating to the given time slot with one or more of the devices connected to the bus.

26. The method according to claim 23, which comprises determining the settings relating to the given time slot based on one of data and instructions transmitted to the respective devices via the bus.

27. The method according to claim 23, which comprises determining the settings relating to the given time slot upon initializing the devices.

28. The method according to claim 23, which comprises storing the settings relating to the given time slot in nonvolatile memory devices.

29. The method according to claim 23, wherein the units for transmitting the data and the information concerning the transmission or the use of the data are frames.

30. The method according to claim 23, wherein the units for transmitting the data and the information concerning the transmission or the use of the data are messages.

31. The method according to claim 23, wherein the units in which the data to be transmitted are transmitted together with the information which is required or useful for the transmission and/or the use of the data is transmitted in each case serially via the bus at a specific transmission clock rate.

32. The method according to claim 23, which comprises determining with the data and information contained in the units containing the data and information required or useful for the transmission or the use of the data, whether certain devices output information onto the bus and at which points in time.

33. The method according to claim 32, which comprises determining with the data and information contained in the units which devices output information onto the bus.

34. The method according to claim 23, which comprises defining the given time slot for transmission of one or more bits via the bus.

35. The method according to claim 23, wherein the data to be output onto the bus during the given time slot comprise a positive acknowledge bit indicating that the device outputting the acknowledge bit onto the bus has previously received in a fault-free condition data transmitted via the bus.

36. The method according to claim 35, wherein the devices which are connected to the bus are set in such a way that exclusively devices for which the data transmitted via the bus are intended acknowledge the fault-free reception of the data by outputting a positive acknowledge bit onto the bus.

37. The method according to claim 35, wherein, if a plurality of the devices connected to the bus are set in such a way that they have to acknowledge the fault-free reception of the data by outputting a positive acknowledge bit, the plurality of devices are set such that the positive acknowledge bits, which are to be output if at least some of the plurality of devices receive fault-free data, are output by the plurality of devices at different points in time.

38. The method according to claim 37, wherein the devices connected to the bus are set such that the one or more second devices, for which the data transmitted via the bus is not intended, do not output any data onto the bus at least at the points in time at which the one or more third devices, for which the data transmitted via the bus is intended, must be able to acknowledge the fault-free reception of the data.

39. The method according to claim 23, wherein the data to be output onto the bus during the given time slot comprise a negative acknowledge bit indicating that the device outputting the negative acknowledge bit onto the bus has previously not received in a fault-free condition data transmitted via the bus.

40. The method according to claim 39, wherein the devices connected to the bus are set such that exclusively, the one or more third devices, for which the data transmitted via the bus is intended, signal a non-fault-free reception of the data by outputting a negative acknowledge bit onto the bus.

41. The method according to claim 39, wherein if a plurality of the devices connected to the bus are set such that they have to signal the non-fault-free reception of the data by outputting a negative acknowledge bit, at least some of the plurality of the devices are set such that they output at the same time the negative acknowledge bits that are to be output if at least some of the plurality of devices receive non-fault-free data.

42. The method according to claim 39, wherein the devices connected to the bus are set such that the at least one second device, for which the data transmitted via the bus is not intended, does not output any data onto the bus at least at the points in time at which the at least one third device, for which the data transmitted via the bus is intended, must be able to signal the non-fault-free reception of the data.

43. The method according to claim 23, wherein the devices connected to the bus are set such that individual devices, a plurality of devices, or all the devices connected to the bus output a positive acknowledge bit onto the bus at different points in time within the given time slot if the devices have received in a fault-free condition data previously transmitted via the bus, or they output a negative acknowledge bit if the opposite is the case, in each case at other, different points in time within the given time slot.

44. The method according to claim 23, wherein the devices connected to the bus are set such that a content of the current frame or of a specific preceding frame or the content of the current message or of a specific preceding message determines which of the devices has to output which information onto the bus at which point in time.

45. A method of transmitting data between devices interconnected via a bus, which comprises:
   transmitting, in units, data and information, concerning at least one of a transmission and a use of the data, from a first device to one or more second devices to which the data does not concern, and/or one or more third devices to which the data does concern;
   forming the units at least partly with at least one region defining a given time slot within which the second and third devices output onto the bus specific information and/or data; and
   defining, in the second and third devices configured to output data acknowledging whether or not the data and information have been received by the second and third devices in a fault-free condition within the given time slot, variable settings of the given time slot selected from the group consisting of a setting to determine under which conditions information and/or data are to be output within the given time slot, a setting to determine which information and/or data are to be output within the given time slot, and a setting to determine at which points in time within the given time slot the information and/or data are to be output.

46. A method of transmitting data between devices interconnected via a bus, which comprises:
   transmitting, in units, data and information, concerning at least one of a transmission and a use of the data, from a first device to one or more second devices, to which the data is not intended and/or one or more third devices, to which the data is intended, the one or more second devices and one or more third devices configured to output data acknowledging whether or not the data and information have been received by the second and third devices in a fault-free condition within the given time slot;
   forming the units at least partly with at least one region defining a given time slot within which the one or more second and third devices output onto the bus information and/or data; and
   defining, in the first device, variable settings of the given time slot selected from the group consisting of a setting to determine which other devices have to output information and/or data within the given time slot, a setting to determine which information and/or data are to be output within the given time slot by the other devices, and a setting to determine at which points in time within the given time slot the other device have to output the respective information and/or data.

* * * * *